United States Patent
Hata

(10) Patent No.: US 11,561,185 B2
(45) Date of Patent: Jan. 24, 2023

(54) ELECTROLYTE SHEET FOR SOLID OXIDE FUEL CELL, UNIT CELL FOR SOLID OXIDE FUEL CELL AND SOLID OXIDE FUEL CELL EQUIPPED WITH SAME, METHOD FOR TESTING ELECTROLYTE SHEET FOR SOLID OXIDE FUEL CELL, AND METHOD FOR MANUFACTURING ELECTROLYTE SHEET FOR SOLID OXIDE FUEL CELL

(75) Inventor: Kazuo Hata, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 226 days.

(21) Appl. No.: 14/009,066

(22) PCT Filed: Mar. 29, 2012

(86) PCT No.: PCT/JP2012/002209
§ 371 (c)(1),
(2), (4) Date: Sep. 30, 2013

(87) PCT Pub. No.: WO2012/132462
PCT Pub. Date: Oct. 4, 2012

(65) Prior Publication Data
US 2014/0017579 A1 Jan. 16, 2014

(30) Foreign Application Priority Data
Mar. 30, 2011 (JP) .............................. JP2011-074356

(51) Int. Cl.
*G01N 21/91* (2006.01)
*C04B 35/486* (2006.01)
(Continued)

(52) U.S. Cl.
CPC ............. *G01N 21/91* (2013.01); *B28B 3/025* (2013.01); *C04B 35/119* (2013.01);
(Continued)

(58) Field of Classification Search
CPC .................................................. H01M 8/1253
See application file for complete search history.

(56) References Cited

U.S. PATENT DOCUMENTS

| | | |
|---|---|---|
| 5,733,499 A | 3/1998 | Takeuchi et al. |
| 5,955,392 A | 9/1999 | Takeuchi et al. |
| 7,108,827 B1 | 9/2006 | Hata et al. |
| 7,748,259 B2 | 7/2010 | Faidi et al. |

(Continued)

FOREIGN PATENT DOCUMENTS

| | | |
|---|---|---|
| JP | 5-254932 A | 10/1993 |
| JP | 8-238613 A | 9/1996 |

(Continued)

OTHER PUBLICATIONS

European Patent Office, European Search Report, Application No. 12765700.5, dated Sep. 4, 2014, Munich, Germany.

*Primary Examiner* — Nathanael T Zemui
(74) *Attorney, Agent, or Firm* — Morgan, Lewis & Bockius LLP

(57) ABSTRACT

In an electrolyte sheet for a solid oxide fuel cell according to the present invention, the number of flaws on at least one of surfaces of the sheet detected by a fluorescent penetrant inspection is 30 points or less in each of sections obtained by dividing the sheet into the sections each measuring 30 mm or less on a side. A unit cell for a solid oxide fuel cell according to the present invention comprises a fuel electrode, an air electrode, and the electrolyte sheet for a solid oxide fuel cell according to the present invention, which is disposed between the fuel electrode and the air electrode. A solid oxide fuel cell of the present invention includes the unit cell for a solid oxide fuel cell according to the present invention.

18 Claims, 5 Drawing Sheets

(51) Int. Cl.
*C04B 35/185* (2006.01)
*C04B 35/626* (2006.01)
*C04B 35/634* (2006.01)
*B28B 3/02* (2006.01)
*C04B 35/119* (2006.01)
*H01M 8/1253* (2016.01)
*H01M 8/04664* (2016.01)

(52) U.S. Cl.
CPC .......... *C04B 35/185* (2013.01); *C04B 35/486* (2013.01); *C04B 35/6261* (2013.01); *C04B 35/634* (2013.01); *H01M 8/1253* (2013.01); *C04B 2235/3224* (2013.01); *C04B 2235/3225* (2013.01); *C04B 2235/3229* (2013.01); *C04B 2235/528* (2013.01); *C04B 2235/5409* (2013.01); *C04B 2235/5436* (2013.01); *C04B 2235/5445* (2013.01); *C04B 2235/6025* (2013.01); *C04B 2235/72* (2013.01); *C04B 2235/725* (2013.01); *H01M 8/04671* (2013.01); *H01M 2300/0077* (2013.01); *Y02E 60/50* (2013.01); *Y02P 70/50* (2015.11)

(56) References Cited

U.S. PATENT DOCUMENTS

| | | | |
|---|---|---|---|
| 7,807,257 | B2 | 10/2010 | Hata et al. |
| 2005/0221161 | A1* | 10/2005 | Komada ............ H01M 8/0206 429/495 |
| 2005/0271919 | A1* | 12/2005 | Hata ...................... C04B 35/01 428/141 |
| 2006/0228555 | A1* | 10/2006 | Hata .................... C04B 35/486 428/409 |
| 2009/0047562 | A1* | 2/2009 | Hata .................. C04B 35/6264 264/332 |
| 2012/0021304 | A1* | 1/2012 | Satake .................... B28B 11/10 429/408 |

FOREIGN PATENT DOCUMENTS

| | | |
|---|---|---|
| JP | 2001-205607 A | 7/2001 |
| JP | 2004198374 A | 7/2004 |
| JP | 2005-035875 A | 2/2005 |
| JP | 2007-017376 A | 1/2007 |
| JP | 2008-164598 A | 7/2008 |
| JP | 2011-053190 A | 3/2011 |
| WO | 99/55639 A1 | 11/1999 |

* cited by examiner

ELECTROLYTE SHEET FOR SOLID OXIDE FUEL CELL, UNIT CELL FOR SOLID OXIDE FUEL CELL AND SOLID OXIDE FUEL CELL EQUIPPED WITH SAME, METHOD FOR TESTING ELECTROLYTE SHEET FOR SOLID OXIDE FUEL CELL, AND METHOD FOR MANUFACTURING ELECTROLYTE SHEET FOR SOLID OXIDE FUEL CELL

This application claims priority under 35 U.S.C. § 371 as a National Stage application of PCT application Serial No. PCT/JP2012/002209, filed Mar. 29, 2012, entitled "ELECTROLYTE SHEET FOR SOLID OXIDE FUEL CELL, UNIT CELL FOR SOLID OXIDE FUEL CELL AND SOLID OXIDE FUEL CELL EQUIPPED WITH SAME, METHOD FOR TESTING ELECTROLYTE SHEET FOR SOLID OXIDE FUEL CELL, AND METHOD FOR MANUFACTURING ELECTROLYTE SHEET FOR SOLID OXIDE FUEL CELL", which claims priority to Japanese Patent Application No. JP2011-074356 filed on Mar. 30, 2011, which are incorporated herein by reference.

TECHNICAL FIELD

The present invention relates to an electrolyte sheet for a solid oxide fuel cell, a unit cell for solid oxide fuel cell and a solid oxide fuel cell provided with the electrolyte sheet. The invention further relates to a method for testing electrolyte sheet for a solid oxide fuel cell and a method for manufacturing an electrolyte sheet for a solid oxide fuel cell.

BACKGROUND ART

Solid oxide fuel cells have high power-generating efficiency, being part of the environmental energy technology for achieving a low-carbon global society by improving the carbon dioxide reduction effect. Therefore, solid oxide fuel cells are expected as a clean power source for use in household and business. As electrolyte membranes for solid oxide fuel cell, the demand for zirconia-based electrolyte sheet has been increasing.

When a zirconia-based electrolyte sheet is used as an electrolyte membrane for a solid oxide fuel cell, unit cells in which electrodes are formed on both sides of the zirconia-based electrolyte sheet are used as cell stacks in which a plurality of the cells are stacked, both sides of which are clamped with a separator.

Therefore, during the operation of solid oxide fuel cells, such a sheet will be maintained for prolonged periods in a state wherein a load of at least 10 g/cm$^2$ is applied at a high temperature of about 750° C. to 950° C., and it is repeatedly exposed to room temperature at the time of starting and stopping, etc. of the operation as well as to high temperature. Under such a condition of use, any defects present in the surface of such a sheet may cause formation of cracks that render the sheet easily prone to breaking, and will largely affect the Weibull coefficient which reflects mechanical strength properties and a variation in the strength. In particular, any damage to a unit cell due to cracking of the electrolyte sheet, even cracking of only a single electrolyte sheet, will greatly affect the reliability of the solid oxide fuel cell.

Accordingly, the present inventors have disclosed in WO 99/55639, a zirconia-based electrolyte sheet having a superior Weibull coefficient as well as a low incidence of breaking and cracking in which the number of defective spots such as cracks having an area of 0.1 mm$^2$ or larger, as detected based on an image obtained with a CCD camera, is no more than 5 per section when such a sheet is divided into a plurality of sections such that a length of each side of the section is 30 mm or less; and also a method of manufacturing a zirconia-based electrolyte sheet involving firing a zirconia green sheet sandwiched between spacers comprised mainly of spherical ceramic particles.

However, even if such an electrolyte sheet having surface defects such as cracks or the like detected by the above-mentioned method is excluded, a problem of cell damage may still occur during the stacking process by stacking unit cells and separators or during the start/stop operation of the solid oxide fuel cell. Therefore, as yet, improvement in the reliability of electrolyte sheet has been demanded against surface defects such as cracks.

Meanwhile, as a method of inspecting cracks in the electrolyte sheet for a solid oxide fuel cell, Japanese Patent Application Publication Hei 8-238613 (1996-238613) discloses a technology of using stereo microscope to observe the number of defects of 10 μm or larger among the surface defects (crack formation) of ceramic substrates with a thickness of at least 30 μm or larger for solid electrolyte for use in fuel cells. This is done by visually counting the defect images of the enlarged field of view of a stereo microscope, and the quantity is essentially determined at the macroscopic level. Therefore, errors will easily occur if the number of sheets to be inspected is large, and thus reliability is poor.

Further, the color check method (dye penetration flaw detection test) is usually used as a flaw detection test of ceramic substrates. It is disclosed in Japanese Patent Application Publication Hei 5-254932 (1993-254932) and Japanese Patent Application Publication 2001-205607 that the flaw detection test is conducted even for electrolyte sheets.

However, these tests are used only for evaluation after specific strength tests such as the thermal shock tolerance test involving maintaining a sheet at high temperature followed by putting it in water to determine the existence of cracks, and the load test involving application of predetermined load at room temperature to observe the occurrence of cracks and fissures. Accordingly, they cannot be used as a satisfactory quality check method for electrolyte sheets during mass production.

SUMMARY OF THE INVENTION

An object of the present invention is to provide an electrolyte sheet for a solid oxide fuel cell having highly reliable strength characteristics.

Another object of the present invention is to provide a unit cell for a solid oxide fuel cell and a solid oxide fuel cell having sufficient strength characteristics by using such an electrolyte sheet having highly reliable strength characteristics.

Another object of the present invention is to provide a testing method for obtaining an electrolyte sheet having such highly reliable strength characteristics, and a method of manufacturing the electrolyte sheet for a solid oxide fuel cell using such a testing method.

The present inventors carried out extensive studies to solve the problems mentioned above. As a result, the present inventors discovered that for an electrolyte sheet intended for practical use of solid oxide fuel cells, a chance of occurrence of fissures and cracks is lowered for a sheet in which cracks were identified on the basis of an image obtained using the CCD camera, but there is a high possibility of missing the electrolyte sheets having micro and fine cracks that were not detected with the CCD camera. That is, the present inventors discovered that the reliability of strength characteristics can be further improved by detecting the micro and fine cracks, which are smaller than the cracks detected based on images obtained using a CCD camera, with high accuracy and efficiency, and that it is possible to provide an electrolyte sheet for a solid oxide fuel cell having a higher reliability of strength characteristics.

More specifically, the present inventors accomplished the present invention by discovering that micro and fine cracks, which cannot be detected by using the CCD camera, can be detected by using the capillary action of the penetrant during the flaw inspection of cracks on the electrolyte sheet surface, and that by using a flaw inspection method employing a fluorescent flaw-detecting penetration agent in the penetrant liquid, the size and position of cracks can be detected continuously with high accuracy. It was proved that this method was excellent for the inspection of a high quality zirconia-based electrolyte sheet.

An embodiment of the present invention provides an electrolyte sheet for a solid oxide fuel cell, wherein at least one surface of the electrolyte sheet has 30 or less cracks in each section as detected by a fluorescent flaw-detecting penetration test, the each section being obtained by dividing the electrolyte sheet into sections such that a length of each side of the section is 30 mm or less.

An embodiment of the present invention also provides a unit cell for a solid oxide fuel cell comprising: a fuel electrode; an air electrode; and an electrolyte sheet for a solid oxide fuel cell of the present invention, the electrolyte sheet intervening between the fuel electrode and the air electrode.

An embodiment of the present invention further provides a solid oxide fuel cell comprising the unit cell for a solid oxide fuel cell of the present invention.

An embodiment of the present invention further provides a method for testing an electrolyte sheet for a solid oxide fuel cell, including:
(I) detecting cracks on a surface of the electrolyte sheet by carrying out a fluorescent flaw-detecting penetration test to the surface of the electrolyte sheet for a solid oxide fuel cell; and
(II) judging an acceptability of the electrolyte sheet by comparing the number of the cracks with a predetermined number, the number of the cracks being obtained by dividing the electrolyte sheet into sections such that a length of each side of the section is 30 mm or less and counting the number of the cracks in each of the obtained section detected by the step (I).

An embodiment of the present invention further provides a method for manufacturing an electrolyte sheet for a solid oxide fuel cell, including:
(i) preparing a green sheet for an electrolyte sheet for a solid oxide fuel cell;
(ii) obtaining the electrolyte sheet for a solid oxide fuel cell by firing the green sheet; and
(iii) testing the electrolyte sheet obtained in the step (ii) by the testing method according to the present invention.

In the electrolyte sheet for a solid oxide fuel cell of the present invention, the number of micro and fine cracks detected by the fluorescent flaw-detecting penetration test is not more than 30 in each section when the sheet is divided into sections such that each side of a section is 30 mm or less. Therefore, according to the present invention, it is possible to reduce the damage of the electrolyte sheet due to cracks, and to provide an electrolyte sheet for a solid oxide fuel cell having strength properties of higher reliability. Further, the unit cell for a solid oxide fuel cell of the present invention comprises the electrolyte sheet. Accordingly, the unit cell of the present invention is a unit cell provided with excellent strength characteristics and high reliability wherein the damage is not likely to occur during the stacking process multiple numbers and separators alternately or during the start/stop operation of the solid oxide fuel cell. Moreover, the solid oxide fuel cell of the present invention is equipped with such a unit cell, and therefore, it has a similar high reliability. Moreover, according to the testing method of the electrolyte sheet for the solid oxide fuel cell of the present invention and the method of manufacturing such, it is possible to obtain an electrolyte sheet provided with highly reliable strength characteristics as mentioned above.

EMBODIMENTS FOR CARRYING OUT THE INVENTION

Figure 1:
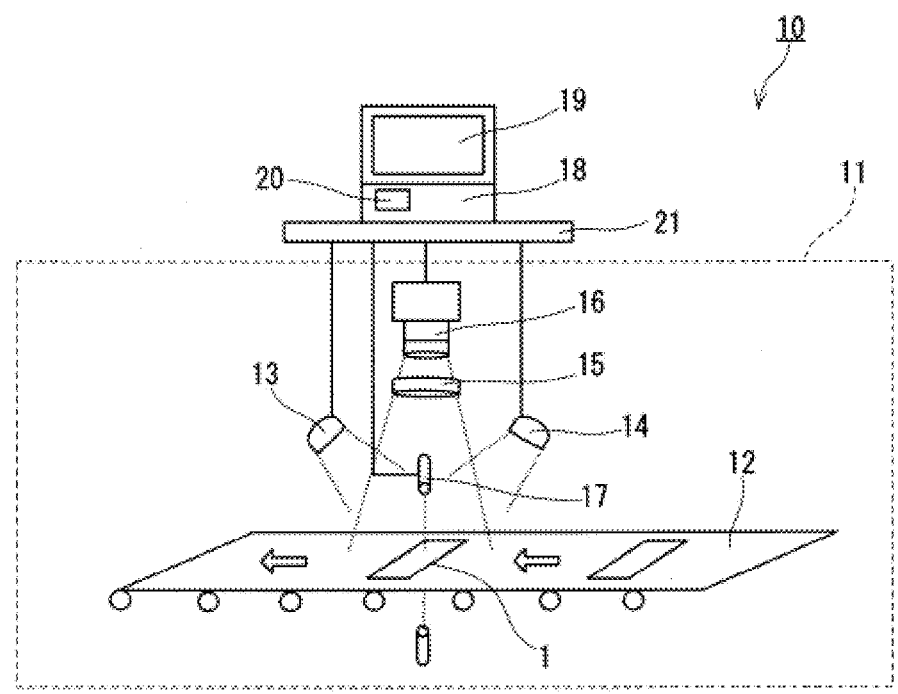
FIG. 1 is a schematic diagram showing the configuration of the fluorescent flaw-detecting penetration testing system used for obtaining an electrolyte sheet in an example of the present invention.

The electrolyte sheet for a solid oxide fuel cell of the present embodiment is a sheet in which, at least on one side, the number of cracks on the surface of the sheet detected by the fluorescent flaw-detecting penetration test is 30 or less in each section when the sheet is divided into sections such that a length of each side of the section is 30 mm or less. It is desirable that, on both sides of the electrolyte sheet for a solid oxide fuel cell of the present embodiment, the number of cracks on the surface of the sheet detected by the fluorescent flaw-detecting penetration test is no more than 30 in each section when the sheet is divided into sections such that a length of each side of the section is 30 mm or less.

The cracks on the surface of the sheet detected by the fluorescent flaw-detecting penetration test are especially micro and fine as compared to the cracks detected based on an image obtained by a conventional CCD camera because the capillary action of the penetrant is used.

In the electrolyte sheet of the present embodiment, the number of cracks detected by the fluorescent flaw-detecting penetration test is identified as no more than 30 in each section when the sheet is divided into sections such that a length of each side of the section is 30 mm or less. However, from a standpoint of reliability, it is needless to say that it is better if the number of cracks is close to a value of zero. If the number of cracks exceeds 30, the sheet strength tends to decline and the reliability is not considered satisfactory. By maintaining the number of cracks in each section to be 25 or less, wherein the sheet is divided into sections such that a length of each side of the section is 30 mm or less, the reliability of strength characteristics can be further enhanced. It is more preferable if the number of cracks is not greater than 20, and is even more preferable if it is not greater than 15.

Moreover, cracks on the surface of a sheet detected by the fluorescent flaw-detecting penetration test will also, normally, include the cracks detected based on images obtained using a conventional (mentioned in WO99/55639) CCD camera. Therefore, in the electrolyte sheet for a solid oxide fuel cell of the present embodiment, it is desirable that the number of cracks detected on the surface of the sheet on the basis of the images obtained using a CCD camera is no more than 7 in each section when the sheet is divided into sections such that a length of each side of a section is 30 mm or less. It is more preferable if the number of cracks is not greater than 6, and even more preferable if it is not greater than 5.

Moreover, a crack detected by the fluorescent flaw-detecting penetration test mentioned herein implies a spot detected by the fluorescent flaw-detecting penetration test, and shapes, areas, and length of the crack, linear or chain streak or indentation, and punctate or circular holes or dents, etc. are not specified. A consecutive detected spot is counted as one spot. Further, it is needless to say that cracks detected by the CCD camera are also detected by the fluorescent flaw-detecting penetration test.

In the present embodiment, the number of cracks is identified in the range in which an electrolyte sheet is divided into sections such that a length of each side of the section is 30 mm or less. For example, in the case of a 90 mm side square-shaped electrolyte sheet, when there is one section having more than 30 cracks among the sections in which a length of each side of the section is 30 mm or less, even if all the other sections have 30 or less cracks, it is not desirable from the perspective of strength reliability of the electrolyte sheet, and poses a problem from the viewpoint of quality control. Therefore, as a condition to distinguish such a sheet having cracks locally and to improve the reliability of strength properties, the inventors have selected a range where division is done into sections of 30 mm. However, depending on the shape and the size of the electrolyte sheets, it may not be always possible to divide the sheet into sections such that a length of each side of the section is 30 mm, and the peripheral edge sections of the sheet may be less than 30 mm. Therefore, in the present embodiment, each section is identified to be no longer than 30 mm per side, and the number of cracks were computed similarly even for the sections of less than 30 mm as well.

The fluorescent flaw-detecting penetration test is a test that is usually used for checking the existence of metal fatigue by discovering fine defects (cracks) on a metal surface caused by metal fatigue. By employing this testing method using fluorescence, it becomes possible to discover and measure the micro and fine cracks, and the method can be applied to the quality control of mass-produced electrolyte sheets. Especially, since cracks with a depth of less than 20 μm and cracks with a length of less than 100 μm, which are hard to be detected by a CCD camera, can be easily detected, it becomes possible to segregate and eliminate an electrolyte sheet that is defective due to cracks, and to achieve a high level quality control of the electrolyte sheet.

The following is a general procedure of the fluorescent flaw-detecting penetration inspection. First, an electrolyte sheet is immersed in or coated with a fluorescent paint. Next, the electrolyte sheet is washed or the fluorescent paint is removed from the electrolyte sheet. This is followed by irradiating the electrolyte sheet with ultraviolet light. Here, if a crack is present on the surface of the electrolyte sheet, the fluorescent paint will enter into that crack, and remain even after the fluorescent paint was removed from the surface, and therefore, when ultraviolet light is shone by a black light or the like under dark environment such as a darkroom, reaction will occur causing fluorescence. In other words, only the cracked sections will fluoresce. A spot emitting such fluorescence is recognized by naked eye. However, the visual inspection with naked eye had a problem of easily being influenced by the experience as well as taking time and efforts, but by image processing the fluorescence and analysing it, the location as well as the number of the mass-produced electrolyte sheets can be easily and efficiently identified.

General inspection methods of the fluorescent flaw-detecting penetration test includes water-washable fluorescent flaw-detecting penetration method, emulsification fluorescent flaw-detecting penetration method, solvent-washable fluorescent flaw-detecting penetration method and the like, and it is not limited to these. From the viewpoint of ease of treating the waste water, the water-washable fluorescent flaw-detecting penetration method and emulsification fluorescent flaw-detecting penetration method are preferable.

As for the fluorescent flaw-detecting penetration test that is used as a method of inspecting cracks on the electrolyte sheet in the present embodiment, a known method described in Japanese Patent Application Publication 2007-17376 or the like can be employed, but in order to inspect the entire lot of mass-produced electrolyte sheets, for example, it is possible to adopt a method provided with;

(1) a placing step of placing an electrolyte sheet, on a surface of which a fluorescent flaw-detecting penetration agent has been impregnated or adsorbed, in a predetermined inspection position in a dark room;

(2) a fluorescence still image acquiring step in which the electrolyte sheet at the inspection position is irradiated, in the dark room, with near-ultraviolet radiation for fluorescent flaw-detecting penetration from a black light, the electrolyte sheet is photographed through a long path filter that allows only visible light to pass through and cuts off the near-ultraviolet radiation, and the fluorescence still image is captured;

(3) a visible still image capturing step in which the electrolyte sheet at the inspection position is irradiated with visible light from a white flash from the same position as and at a different time from the above step, and the electrolyte sheet is photographed through a long path filter to obtain a visible still image; and (4) an image processing step for displaying a superimposed image in which the fluorescent still image and visible still image are superimposed using an image processing device.

Combining this method with a conveying device such as a belt conveyor or a roller conveyor provided with a position detection sensor enables a continuous fluorescent flaw-detecting penetration inspection on the image in a short period of time, and therefore, it becomes possible to inspect the entire lot for mass production.

Moreover, the image processing device is provided with a memory device for storing the size and shape of the electrolyte sheet, identifies the inspection area on the visible still image by a pattern matching of the visible still image and the shape of the electrolyte sheet, and erases images that are outside the inspection area from the fluorescent still image.

Also, a known method can also be used for the crack detection method of an electrolyte sheet on the basis of the image obtained by a CCD camera, but the method described in the patent document 1 is preferable.

As described above, the electrolyte sheet for a solid oxide fuel cell of the present embodiment is identified by the number of cracks detected by the fluorescent flaw-detecting penetration test. That is, the fluorescent flaw-detecting penetration test is adopted as the method for inspecting an electrolyte sheet for a solid oxide fuel cell. Thereupon, from another perspective, as the method for inspecting an electrolyte sheet for a solid oxide fuel cell of the present embodiment, it is possible to define a method comprising:
(I) detecting cracks on a surface of the electrolyte sheet by carrying out a fluorescent flaw-detecting penetration test to the surface of the electrolyte sheet for a solid oxide fuel cell, and
(II) judging an acceptability of the electrolyte sheet by comparing the number of the cracks with a predetermined number (here, the number is 30), the number of the cracks being obtained by dividing at least one side (preferably both sides) of the electrolyte sheet into sections such that a length of each side of the section is 30 mm or less and counting the number of the cracks in each of the obtained sections detected by the step (I).

From yet another perspective, as a method of manufacturing an electrolyte sheet for a solid oxide fuel cell of the present embodiment, it is possible to define a method comprising:
(I) preparing a green sheet for an electrolyte sheet for a solid oxide fuel cell,
(ii) obtaining the electrolyte sheet for a solid oxide fuel cell by firing the green sheet; and
(iii) testing the electrolyte sheet obtained in the step (ii) by the testing method of an electrolyte sheet for a solid oxide fuel cell.

Next, the manufacturing method, shape, and the like of the electrolyte sheet for a solid oxide fuel cell of the present embodiment are explained in detail below.

Zirconia-based oxides, ceria-based oxides, and lanthanum gallate-based oxides are preferably used as the ceramics constituting the electrolyte sheet of the present embodiment. Desirable zirconia-based oxides are exemplified by solid solution of one or more oxides selected from a group consisting of alkaline earth metal oxides such as MgO, CaO, SrO and BaO, rare earth metal oxides such as $Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$ and $Yb_2O_3$, $Si_2O_3$, and $In_2O_3$ as a stabilizer, or a dispersion-strengthened zirconia in which $Al_2O_3$, $TiO_2$, $Ta_2O_5$ and/or $Nb_2O_5$ are added to the above-mentioned as dispersion-strengthening agents. Particularly desirable is a zirconia-based oxide stabilized with an oxide of at least one element selected from a group comprised of scandium, yttrium, cerium, and ytterbium.

These oxides may be used either alone or as a suitable combination of at least two of them as necessary. Of the examples mentioned above, a zirconia having a tetragonal and/or cubic crystal structure that is stabilized with 3 to 10 mol % of yttrium oxide, 4 to 12 mol % of scandium oxide, or 4 to 15 mol % of ytterbium oxide, is particularly preferred for obtaining an electrolyte sheet having superior thermal properties, mechanical properties, chemical properties, and oxygen ion conductivity. Among these, a zirconia stabilized with 8 to 10 mol % of yttrium oxide (8YSZ to 10YSZ), a zirconia stabilized with 6 to 12 mol % of scandium oxide (6ScSZ to 12ScSZ), a zirconia stabilized with 10 mol % of scandium oxide and 1 to 2 mol % of ceria (10Sc1CeSZ to 10Sc2CeSZ), a zirconia stabilized with 10 mol % of scandium oxide and 1 mol % of alumina (10Sc1AlSZ), and a zirconia stabilized with 10 mol % of scandium oxide and 1 mol % of yttria (10Sc1YSZ) are optimal. An example of a ceria-based oxide can be a ceria doped with yttria, samaria and/or gadolia or the like. An example of a lanthanum gallate-based oxide can be offered lanthanum gallate, a material in which a part of lanthanum and/or gallium in the lanthanum gallate is substituted for strontium, calcium, barium, magnesium, aluminum, indium, cobalt, iron, nickel and/or copper.

The electrolyte sheet of the present embodiment is manufactured by coating a slurry comprising the oxide powder, binder, plasticizer, a dispersing agent or the like on a long green tape, forming green sheets by cutting the green tape into a desired shape, firing the obtained green sheets to evaporate and burn off the organic constituents in the green sheets, followed by sintering the oxide powder to a sheet form in a dense manner.

The shape of the electrolyte sheet of the present embodiment is exemplified by planar, curved, dimple, film, cylindrical, cylindrical planar, honeycomb forms or the like, however, the planar form is particularly desirable. As a planar electrolyte sheet for a solid oxide fuel cell, an electrolyte sheet made from the dense sintered body of the above-mentioned oxides having a thickness of 50 μm to 400 μm, preferably 80 μm to 300 μm, more preferably 100 μm to 300 μm, and having a plane area of 50 $cm^2$ to 900 $cm^2$, more preferably 80 $cm^2$ to 500 $cm^2$, is optimal.

Further, the electrolyte sheet for a solid oxide fuel cell of the present embodiment can be configured into a unit cell for a solid oxide fuel cell by forming a fuel electrode on one side and an air electrode on the other side. In other words, a unit cell for solid oxide fuel cell of the present embodiment is provided with a fuel electrode, an air electrode, and an electrolyte sheet for a solid oxide fuel cell of the present embodiment disposed between the fuel electrode and the air electrode. A surface-roughened electrolyte sheet may be employed for a unit cell. This is to confer an anchor effect on the electrolyte sheet surface in order to prevent the deterioration of the power generation efficiency due to peeling off of an interface between the electrolyte sheet and the fuel electrode, and an interface between the electrolyte sheet and the air electrode, and to improve the power generation efficiency by increasing the electrode reaction field at the interfaces. Since roughening the surface of the electrolyte sheet leads to an increase in flaws on the surface of the electrolyte sheet, it is desirable to control the roughening so as to keep the surface roughness as small as possible even when providing the roughening.

It is preferable to adjust the specific surface roughness of the electrolyte sheet such that both one side and the other side of the sheet are in a range of 0.02 μm to 1.5 μm in Ra. A range of 0.05 μm to 1.2 μm is more preferable, and 0.08 μm to 1.0 μm is even more preferable. Further, the surface roughness Ra mentioned here refers to the surface roughness (Ra) determined in accordance with the JIS B0601:2001 standard.

The electrolyte sheet can be of any shape including a circular shape, an elliptical shape and a rectangular shape with rounded corners, and these sheets may further include one or more holes having a similar circular shape, an elliptical shape and a rectangular shape with rounded corners. When the sheet has a hole, the planar area means an area enclosed by the outer peripheral edge including the area of the hole.

A method generally used for producing the long green tape is to continuously laying and casting in a tape-shape the slurry containing an oxide powder and an organic binder, dispersant, solvent, and optionally a plasticizer and a defoaming agent onto a polymer film, which has been processed to be releasable, by doctor blade method, calendar method, extrusion method or the like; and to dry this by evaporating the solvent to form a long green tape. However, it is preferable to use the doctor blade method from the perspective of mass production and accommodating sheet thickness.

Regarding the type of a binder used in the manufacturing of the green tape, conventionally known organic binders can be suitably selected and used. The organic binders are exemplified by ethylene copolymers, styrene copolymers, acrylate and methacrylate copolymers, vinyl acetate copolymers, maleic acid copolymers, vinyl butyral resins, vinyl acetal resins, vinyl formal resins, vinyl alcohol resins, waxes, celluloses such as ethyl cellulose or the like, for example.

Among these, from the view point of formability, strength, thermal decomposition during firing and the like of the green tape, (meth)acrylate copolymers having a number average molecular weight of preferably 20,000-500,000, more preferably 50,000-400,000, and even more preferably 100,000-300,000, and a glass transition temperature (Tg) of preferably −10 to 80° C., more preferably 0 to 70° C., and even more preferably 5 to 60° C. are recommended wherein the (meth)acrylate polymers are prepared by polymerization or copolymerization of at least one kind selected from the group consisting of alkyl acrylates having an alkyl group of 10 carbon atoms or less such as methyl acrylate, ethyl acrylate, propyl acrylate, butyl acrylate, isobutyl acrylate, cyclohexyl acrylate, 2-ethylhexyl acrylate and the like; alkyl methacrylates having an alkyl group of 20 carbon atoms or less such as methyl methacrylate, ethyl methacrylate, butyl methacrylate, isobutyl methacrylate, octyl methacrylate, 2-ethylhexyl methacrylate, decyl methacrylate, dodecyl methacrylate, lauryl methacrylate, cyclohexyl methacrylate or the like; hydroxyalkyl acrylates or hydroxyalkyl methacrylates having a hydroxyalkyl group such as hydroxyethyl acrylate, hydroxypropyl acrylate, hydroxyethyl methacrylate and hydroxypropyl methacrylate; aminoalkyl acrylates or aminoalkyl methacrylates such as dimethylaminoethyl acrylate and dimethylaminoethyl methacrylate; and carboxyl group-containing monomers such as acrylic acid and meth acrylic acid, maleic acid and half esters of maleic acid such as monoisopropyl maleate.

Further, in order to prepare an electrolyte sheet in which the number of cracks as detected by the fluorescent flaw-detecting penetration test is small such as an electrolyte sheet of the present embodiment, it is preferable to avoid a problem of occurrence of cracks in their surface due to a soft nature of the green tape and the green sheet when cutting the green tape and during the firing of the green sheet in which the green sheet comes in contact with the setter and/or spacer. Accordingly, it is desirable to prepare the green tape and green sheet with an appropriate hardness such that cracks will be difficult to occur.

Therefore, in order to manufacture the electrolyte sheet, it is desirable that the degree of penetration of the green tape and green sheet, as measured in accordance with the penetration test method (temperature: 25° C., load: 100 g, time: 5 sec) of Petroleum asphalt according to JIS K-2530, is adjusted so as to be preferably 0.01 to 0.3 mm/min, more preferably 0.02 to 0.25 mm/min, and even more preferably 0.03 to 0.2 mm/min.

The adjustment of the penetration degree of the green tape and the green sheet is influenced by the acid value and the acid value ratio (acid value ratio=acid value÷(acid value+hydroxyl value+amine value)) of the binder in addition to the number average molecular weight and glass transition temperature mentioned above. Therefore, in order to satisfy the moldability and the cutting workability of the green tape as well as making cracks less likely to occur on the electrolyte sheet after firing, the acid value of the binder is adjusted to be preferably 0.1 to 30, more preferably 0.2 to 20 and even more preferably 0.3 to 10, and the acid value ratio to be preferably 0.01 to 0.3, more preferably 0.02 to 0.25, and even more preferably 0.03 to 0.2. In the green tape that uses a binder adjusted as above, cracks or tucks are unlikely to occur even when the long tape is wound, and crazing is unlikely to occur even when the green tape is cut into predetermined dimensions, and thereby it becomes possible to obtain an electrolyte sheet in which the number of cracks is extremely low even if the green sheet is fired.

These organic binders may be used alone or by appropriately mixing two or more types as required. Particularly desirable is a polymer of a monomer containing at least 60 mass % of isobutyl methacrylate and/or 2-ethylhexyl methacrylate, and at least 0.05 mass % of acrylic acid or methacrylic acid.

Regarding the usage ratio of the binder to the oxide powder, 10 to 30 parts by mass, more preferably 15 to 20 parts by mass, of the binder with respect to 100 parts by mass of the oxide powder is optimal from the viewpoint of moldability of the green tape, hardness of the green sheet, thermal decomposition properties, and the flatness of the electrolyte sheet obtained by firing of the green sheet.

Moreover, as solvents used to manufacture the green tape, water, alcohols such as methanol, ethanol, 2-propanol, 1-butanol and 1-hexanol etc.; ketones such as acetone and 2-butanone etc.; aliphatic hydrocarbons such as pentane, hexane and butane; aromatic hydrocarbons such as benzene, toluene, xylene and ethylbenzene; and acetate esters such as methyl acetate, ethyl acetate and butyl acetate can be appropriately selected and employed. These solvents may also be used either alone, or by mixing two or more types as appropriate. The amount of these solvents to be used may be adjusted suitably by taking into account the viscosity of the slurry at the time of forming the green tape, and it is preferable to make an adjustment such that the slurry viscosity is in a range of 1 to 50 Pa·s, more preferably 2 to 20 Pa·s.

In the preparation of the slurry, in order to promote the peptization or dispersion of raw material powder, dispersants such as polymeric electrolyte like polyacrylic acid and ammonium polyacrylate; organic acid such as citric acid and tartaric acid; copolymers of isobutylene or styrene and maleic anhydride, their ammonium salts, amine salts; butadiene-maleic anhydride copolymers and their ammonium salts etc. may be added as required. Further, in order to impart flexibility to the green sheet, plasticizers such as phthalate esters like butyl phthalate and dioctyl phthalate; glycols or glycol ethers such as propylene glycol; polyesters such as polyesters based on phthalic acid, polyesters based on adipic acid and polyesters based on sebacic acid, may be added as required. Furthermore, surface acting agents or defoaming agents may also be added as required.

After obtaining a long green tape by shaping the slurry comprising mixture of the above-mentioned raw materials into an appropriate thickness using the methods mentioned above and drying it, it is cut into a desired shape and size to obtain a green sheet. There is no particular restriction on conditions for drying, and drying may be done at a constant temperature of room temperature to 150° C., or thermal drying may be carried out by gradually raising the temperature continuously such as 50° C., 80° C. and 120° C., for example.

As described above, the electrolyte sheet of the present embodiment is produced by firing the green sheet of a predetermined shape, evaporating and combusting the organic components of the green sheet, and sintering the electrolyte powder into a sheet shape.

When the firing process is performed, according to the technique described in Patent document 1, there is a method of sandwiching a porous ceramic sheet as a spacer between the green sheets of a predetermined shape such that the peripheral edges of the green sheet does not protrude from the porous ceramic sheet, making a stack in which the green sheets and the porous ceramic sheets are alternately stacked, followed by firing. Such a porous ceramic sheet also has the effect of reducing the waving and warping of an electrolyte sheet through uniform dissipation of the organic component decomposed gas from the green sheets, suppressing the bonding between the electrolyte sheets, and improving the productivity of the electrolyte sheet.

In order to produce an electrolyte sheet of the present embodiment, the spacers and the green sheets are stacked alternately as described above, and fired. Using a ceramic sheet provided with a plurality of convexes as a spacer, wherein the ceramic sheet has a plurality of projections on one side,
the basal plane of the convexes is circular, elliptical, and the shape of the vertex is a polyhedron with rounded angles with a radius of curvature of at least 0.1 µm,
the average height of the convexes is 0.05 µm to 50 µm, preferably 0.08 µm to 10 µm and still more preferably 0.1 µm to 5 µm, and
the mean thickness is 100 µm to 400 µm, is especially superior in reducing the occurrence of cracks in the electrolyte sheet. The mean height of the convexes refers to a mean value calculated from a value that is obtained by measuring the height of all the convexes present in a 5 µm to 2 mm square region (it is a region containing at least the center of the spacer surface, and at least 50 convexes are present in that region) in the spacer surface.

Further, the height of a convex is the distance from the baseline (line formed by the basal plane) of the spacer to the highest point. The height of a convex can be determined by acquiring a ultra-deep color image of the spacer surface with an observation application ("VK VIEWER", a product of Keyence Corporation) using a color 3D profile microscope (Model number: VK-9500, a product of Keyence Corporation), and simultaneously subjecting the image to a shape measurement of the convex by a shape analysis of the spacer surface profile with view application software ("VK ANALYZER", a product of Keyence Corporation). More specifically, a photographed image of the spacer surface (corresponding to XY axis) and convex shape profile data (corresponding to Z axis) are superposed using the line passing through the center of several convexes as the base line, and the plane passing through the intersection of the outermost periphery contour part of a convex on the photographed image and the convex shape profile was considered as the basal plane. The normal distance from the baseline to the highest point in the convex shape profile was taken as the convex height.

Further, the average thickness of the spacer was measured in the same manner as the radius of curvature and the average height of the convexes, using the ultra-deep color 3D profile measurement microscope in a similar manner, by taking the color ultra-deep images of the spacer cross section with an observation application, and at the same time the shape analysis of the spacer surface profile was performed on the image using an analysis application to identify the base face on one side of the spacer and the base face on the other side thereof to measure the shape. The distance between two basal planes of the obtained sheet was considered as the thickness of the sheet, and the mean value of the distances at five arbitrary locations was considered as the mean thickness of the sheet.

In the spacer having such a convex shape (hereafter, convex shaped spacer), each of the convexes is of hemispherical shape, semi-elliptical spherical shape, or a polyhedron wherein the cross-sectional shape of the vertex and edge are curved with a radius of curvature of at least 0.1 µm, and these convexes are disposed regularly over the entire spacer surface, for example. Therefore, as for the alternately-stacked green sheets and the convex shaped spacers will be in a point contact instead of a surface contact or line contact unlike the prior art, and therefore, the contact area becomes small. As a result, the load applied on the green sheet in the stacked state of the spacers and green sheets is uniformly dispersed, and the friction caused by shrinkage of the green sheet during firing also becomes very small, and therefore, the number of cracks occurring on the surface of the electrolyte sheet, especially the number of micro and fine cracks, is expected to become very small.

As a result, the locations of flaws which become the origin for the occurrence of cracks in the electrolyte sheet are reduced, the strength characteristics are improved, and the reliability of the electrolyte sheet is improved.

As for a convex shaped spacer, assuming that the spacer thickness is 100, it is optimal if the mean height of the convexes on one side is 0.1 to 33, preferably 0.2 to 10, and more preferably 0.3 to 5. It is further preferable that the value of any variation in the mean height of such convexes of the convex shaped spacer (standard deviation/mean height of height) is 0.25 or less, the value of any variation in the circle equivalent diameter of the basal plane of such convexes (standard deviation/circle equivalent mean diameter of the circle equivalent diameter) value is 0.25 or less. Furthermore, it is even more preferable if the ratio of the mean height of the convexes and the mean circle equivalent diameter (mean height/circle equivalent mean diameter) is 0.05 to 0.5.

The above-mentioned convex shaped spacer may be dense or porous, and its porosity is 0 to 50%, preferably 1 to 40%, and more preferably 3 to 30%.

Further, it is desirable for the above-mentioned convex shaped spacer to include at least one material selected from a group consisting of alumina, zirconia, and mullite for preventing solid-phase reaction with the components of an electrolyte sheet during firing.

The method of manufacturing a ceramic sheet for the convex shaped spacer includes a step of pressing a stamper on one side or both sides of a green sheet made of at least one material selected from a group consisting of alumina, zirconia, and mullite. The stamper has depressions wherein the shape of the basal plane is circular, elliptical, or the shape of the vertex section is a polygonal shape with rounded angles having a curve with a radius of curvature of at least 0.1 µm, and/or their three-dimensional shape is hemi-spherical or semi-elliptical spherical, and has a cross-sectional shape of the vertex and crest is a polyhedron with a curve having radius of curvature of at least 0.1 µm, and that the circle equivalent diameter of the depression is 0.05 µm to 50 µm as well as the depth of the depression is 0.05 µm to 50 µm.

The maximum stress of the green sheet, at the temperature during the pressing of the aforementioned stamper, is preferably 1.96 MPa to 19.6 MPa, and the degree of elongation at the maximum stress is preferably 20% or more to less than 500%. Further, the slurry for forming the green sheet shall preferably contain 12 to 30 parts by mass of an organic binder with respect to 100 parts by mass of the aforementioned ceramic sheet raw material. With these conditions, it is possible to stably produce uniform projection shapes.

The unit cell for a solid oxide fuel cell of the present embodiment is an electrolyte supported cell obtained by having the electrolyte sheet of the present embodiment as a supporting body, and providing a fuel electrode on one surface and an air electrode on the other surface by screen printing or the like. Because the cell supporting body is an electrolyte sheet of the present embodiment in which the number of surface cracks is small, particularly the number of micro and fine cracks is very small, the aforementioned unit cell also has superior strength properties with improved reliability.

In the method of manufacturing the unit cell, the order of forming the fuel electrode and the air electrode can be decided as appropriate. The electrode for which a lower temperature is required for firing may be formed into a film and fired first on the electrolyte sheet, followed by forming the other electrode into a film and firing, or the fuel electrode and the air electrode can be fired simultaneously. In order to avoid formation of high resistance components due to solid phase reaction between the electrolyte sheet and the air electrode, a ceria intermediate layer may also be provided as a barrier layer between the electrolyte sheet and the air electrode. In this case, the fuel electrode is provided on a surface opposite to the surface on which the intermediate layer was provided or is to be provided, and the air electrode is provided on the intermediate layer. Here, the order of forming the intermediate layer and the fuel electrode is not particular limited, and further, the intermediate layer and the fuel electrode may be formed simultaneously by coating and drying an intermediate layer paste and a fuel cell paste on each surface of the electrolyte sheet and then sintering them.

A material of the fuel electrode and the air electrode, a material of the intermediate layer, and further the method of coating a paste and drying condition for forming them may be implemented as per the conventionally known methods.

Also, the solid oxide fuel cell of the present embodiment is provided with a unit cell of the present embodiment having superior strength characteristics and high reliability. Therefore, the solid oxide fuel cell of the present embodiment has high reliability because of a reduced chance of damage of unit cell and superior durability.

EXAMPLES

Below, the present invention is explained in more detail with examples. The present invention is not intended to be limited by the following examples. It is also possible to implement the present invention by adding suitable modifications to the following examples within the scope of the objectives mentioned earlier and later. All of such modifications are still within the technical scope of the present invention.

First, a description will be given on the evaluation and testing methods used in the present examples and comparative examples.

<Evaluation and Inspection Methods>

(1) Fluorescent Flaw-Detecting Penetration Inspection of the Electrolyte Sheet

FIG. 1 shows the overall configuration of the fluorescent flaw-detecting penetration device used in these examples. As shown in this figure, the fluorescent flaw-detecting penetration device 10 used in the present examples has been provided with a dark room 11, a roller conveyor 12, a black light 13, a white stroboscope 14, a long path filter 15, a CCD Camera 16, a position detection sensor 17, and an image processing device 18 as the basic configuration. In the present examples, cracks were inspected by the following method using the device 10. In the figure, 1 is an electrolyte sheet to be inspected.

The electrolyte sheet 1 to be inspected had been subjected, in a previous step (not shown), to a pre-treatment for removing the surface deposits of the electrolyte sheet 1, the impregnation treatment, the washing treatment, and the development process mentioned above. That is, the electrolyte sheet 1 was in a state wherein the fluorescent had already been penetrated into the surface cracks. A water-soluble fluorescent penetrant solution (Eishin Chemical Co., Ltd., product name 'Neoglow, F-4A') was used as the fluorescent agent. Further, the duration of the impregnation treatment was 5 minutes, and the impregnation-treated electrolyte sheet was washed with water spray from a distance of 30 cm. The cleaned status was checked by irradiating the electrolyte sheet with black light, and the moisture was eliminated by drying the electrolyte sheet.

The electrolyte sheet 1 that had been surface-impregnated with the fluorescent agent was transported on the roller conveyor 12 to a predetermined inspection position in the dark room 11, and the electrolyte sheet 1 was held temporarily at the predetermined position. Using the black light ('Ultra Light S-35', a product of Eishin Chemical Co., Ltd.) 13 for fluorescent flaw detection, the electrolyte sheet 1 that is held at the inspection position was irradiated continuously with a near-ultraviolet radiation of the wavelength of 375 nm, and a fluorescent still image was taken with the CCD imaging camera 16. Next, the electrolyte sheet 1 was irradiated with visible light for a period of $1/1000$ sec with a white stroboscope 14 that is used for normal photography, and a visible still image for determining the outline of the electrolyte sheet 1 was taken with the CCD imaging camera 16.

As the CCD imaging camera 16, a digital video camera with an effective pixel number of the CCD of 1000×1000 pixels or more was used, and the field of view was set to have 100 mm on one side by matching with the dimensions of the electrolyte sheet 1.

The image processing device 18 is provided with a central processing unit (CPU) (not shown in the figure), an image display unit 19, a storage unit 20, and a communication control unit 21. The image processing device 18 computed the quantity of fluorescent spots by:

displaying a superimposed image obtained by superimposing the fluorescence still image and the visible still image, identifying the inspection region in the visible still image by pattern matching the visible still image with the shape of the electrolyte sheet 1, eliminating an image outside the inspection area from the fluorescent still image, identifying the fluorescent spots by morphology-processing the fluorescent still image, and pattern matching the visible still image with the shape of the electrolyte sheet.

Figure 2:
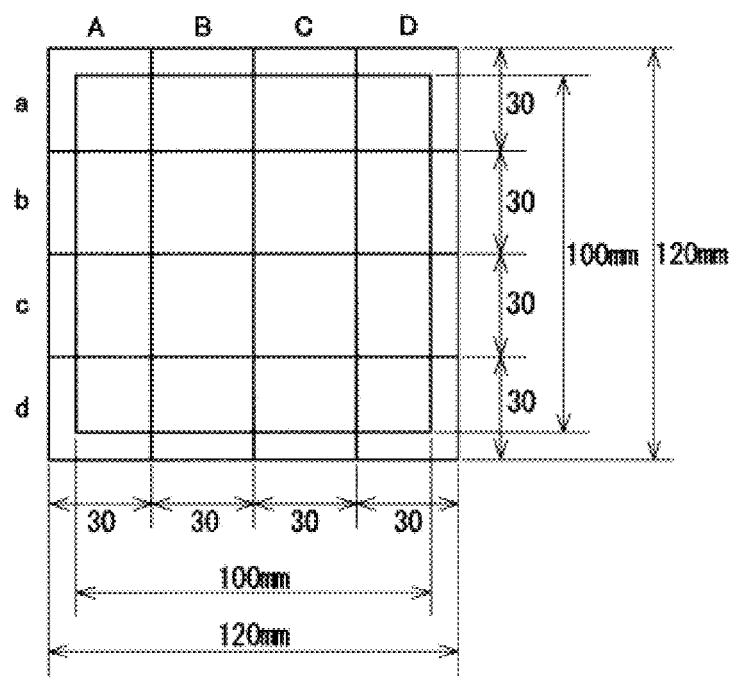
FIG. 2 is a schematic diagram of an example wherein a square electrolyte sheet having 100 mm per side has been divided into sections such that a length of each side of the section is 30 mm or less in examples of the present invention.

In this Example, the inspection area was determined as each section obtained by dividing into sections wherein each side of a section was 30 mm or less. Since the electrolyte sheet being inspected is a rectangular sheet in which each side has 100 mm, its section was divided, as shown in FIG. 2, into a total of 16 sections such as Aa, Ab, . . . , Dd.

(2) CCD Flaw Inspection of Electrolyte Sheet

The fluorescent flaw-detecting penetration inspection equipment 10 was used, however, the fluorescent agent was not impregnated in the electrolyte sheet 1 to be inspected, and also, a visible still image of the electrolyte sheet 1 was acquired by irradiating only visible light from white stroboscope instead of black light 13 to calculate the number of cracks in each of the sections obtained by dividing the sheet into sections wherein a length of each side of the section was 30 mm or less. Further, there is no particular restriction on the order of carrying out the fluorescent flaw-detecting penetration inspection and CCD flaw inspection of the electrolyte sheet, however, taking the operation efficiency into consideration, the CCD flaw inspection was carried out first followed by the fluorescent flaw-detecting penetration inspection in this example.

(3) Bending Strength Test

Bending strength was measured at four spots for twenty electrolyte sheets and twenty unit cells in accordance with JIS R 1601. The measurement was performed on the sheets that had been subjected to measurement of cracks, and for the unit cells using the same.

Figure 3:
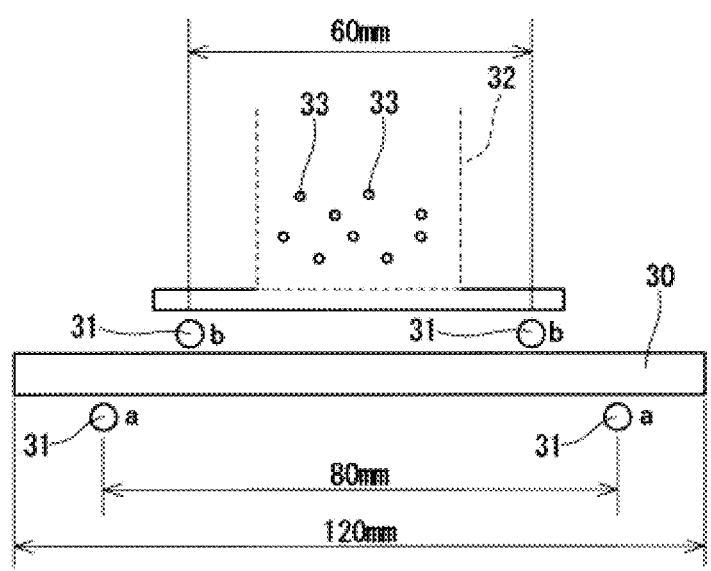
FIG. 3 is a schematic diagram showing the configuration of equipment used for measurement of bending test of an electrolytic sheet in examples of the present invention.

Specifically, as shown in FIG. 3, an electrolyte sheet 30 was sandwiched between four 8 mm diameter×120 mm long stainless steel rods 31 that function as supports. The position of the stainless steel rods 31 was adjusted such that the distance between the bottom supports (a-a) is 80 mm, and the distance between the upper load supports (b-b) is 60 mm. A basket was arranged between the upper load points, and load was uniformly applied over the entire electrolyte sheet 30 by putting 1 mm diameter lead balls inside the basket. The lead balls were loaded until the electrolyte sheet 30 was damaged, and from the load when the electrolyte sheet 30 got damaged, the mean 4-spot bending strength of the electrolyte sheet 30 was computed. Measurement of the unit cell was also carried out by a method similar to the one used for the electrolyte sheet 30.

(4) Load-Tolerance Test

Figure 4:
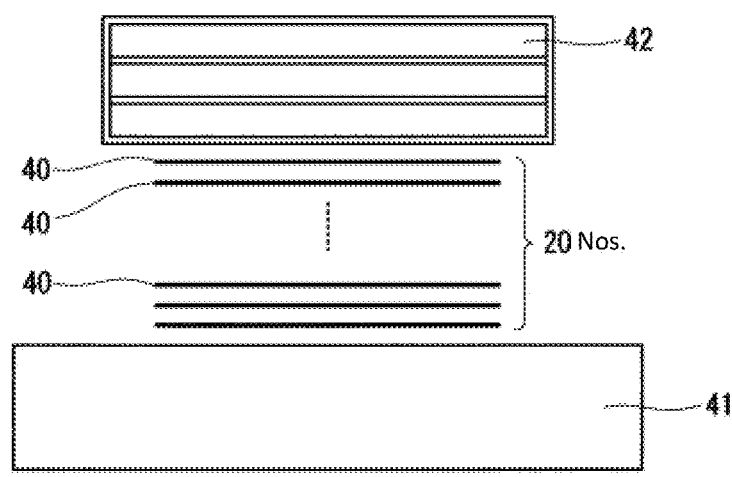
FIG. 4 is a schematic diagram showing the configuration of equipment used for load-tolerance test of an electrolytic sheet in examples of the present invention.

As shown in FIG. 4, twenty electrolyte sheets 40 were piled up on an alumina setter 41 placed in an electric furnace, and a dense alumina board 42 for applying a load that is equivalent to 5 kg was mounted on the electrolyte sheets. In such a state (a state in which 50 g/cm$^2$ load is being applied), it was maintained for 100 hours at 1000° C.

After 10 hours, the alumina plate 42 was removed, and the presence of cracks in the twenty electrolyte sheets 40 was visually inspected. The number of sheets having cracks was counted, and the mean cracking rate was computed.

Next, the green sheets for the electrolyte sheets used in the present examples and comparative examples, and the spacer used in the firing of the green sheets will be described in detail.

<Green Sheets for Electrolyte Sheet>

(1) 6ScSZ Green Sheet

With respect to 100 parts by mass of zirconia powder stabilized with 6 mol % scandium (Dai-ichi Kigenso Kagaku Kogyo Co., Ltd., product name: '6ScSZ', specific surface area: 11 m$^2$/g, mean particle size: 0.5 μm, hereafter referred as 6ScSZ.), 17 parts by mass (on solids basis) of a methacrylate copolymer-based binder (number average molecular weight: 100,000, glass transition temperature: −8° C., acid value: 1, acid value ratio: 0.04, solids concentration: 50 weight %), 2 parts by mass of a sorbitan fatty acid ester surface active agent as dispersant, and 3 parts by mass of dibutyl phthalate as plasticizer were charged into a nylon pot along with a toluene/isopropyl alcohol mixed solvent (mass ratio: 3/2), and milled for 20 hours at 60 rpm to prepare a raw material slurry. This slurry was transferred to a vacuum degassing container, evacuated to 3.99 kPa to 21.3 kPa (30 Torr to 160 Torr), concentrated and degassed to obtain slurry for coating having viscosity of 2.5 Pa·s.

The obtained coating slurry was transferred to the slurry dam of a coating equipment, continuously applied on a PET film by the doctor blade of the coating section, passed through a drying furnace of 110° C. that is next to the coating section at a rate of 0.15 m/min to evaporate off the solvent, and dried to a form a long 6ScSZ green tape. This green tape was cut to obtain approximately 125 mm square 6ScSZ green sheets of approximately 220 μm thickness. The penetration of the green sheet was 0.26 mm/min.

(2) 8YSZ Green Sheet

With respect to 100 parts by mass of zirconia powder stabilized with 8 mol % yttrium (Dai-ichi Kigenso Kagaku Kogyo Co., Ltd., product name: 'HSY-8', specific surface area: 10 m$^2$/g, mean particle size: 0.5 μm, hereafter referred to as 8YSZ.), 18 parts by mass (on solids basis) of a methacrylate copolymer-based binder (number average molecular weight: 200,000, glass transition temperature: 5° C., acid value: 3, acid value ratio: 0.1, solids concentration: 45 weight %), 2 parts by mass of a sorbitan fatty acid ester surface active agent as dispersant, 3 parts by mass of dibutyl phthalate as plasticizer and a toluene/isopropyl mixed solvent (mass ratio: 3/2) were employed to prepare a slurry similarly to the case of 6ScSZ green sheet, and it is made into a long 8YSZ green tape by the doctor blade method. This green tape was cut to obtain approximately 125 mm square 8YSZ green sheets of approximate thickness of 320 μm. The penetration of the green sheet was 0.09 mm/min.

[Spacer]

(1) Convex Shaped Alumina/Zirconia-Based Spacer (Preparation of Alumina/Zirconia-Based Green Sheet)

With respect to 80 parts by mass of low soda alumina powder of mean particle size of 1.6 μm (Showa Denko Co., Ltd., product name 'AL-160SG') and 20 parts by mass of zirconia powder stabilized with 3 mol % of yttrium oxide (Dai-ichi Kigenso Kagaku Kogyo Co., Ltd., product name 'HSY-3', mean particle size: 0.4 μm, specific surface area: 8.5 m$^2$/g), 15 parts by mass on solid conversion of a similar binder as in the case of 6ScSZ green sheet, 2 parts by mass of a sorbitan fatty acid ester surface active agent, 5 parts by mass of dibutyl phthalate as plasticizer were charged into a nylon pot along with a toluene/isopropyl mixed solvent (mass ratio: 3/2), and milled for 20 hours at 60 rpm to prepare a raw material slurry.

Further, as in the case of the 6ScSZ green sheet, this slurry was concentrated and degassed so that the viscosity was adjusted to 10 Pa·s, and coated by the doctor blade method to obtain a long green tape. Also, similarly to the manufacturing of the green sheet for an electrolyte sheet, this green tape was cut to obtain alumina/zirconia-based green sheets of approximately 160 mm square and approximately 210 μm thicknesses.

(Preparation of Convex Shaped Alumina/Zirconia-Based Spacer)

The alumina/zirconia-based green sheet was mounted on a heating table, and a stamper was stacked thereon to form a laminate body (heating table/green sheet/stamper). A stamper having a pressing part and substrate made of nickel wherein the recess shape was of a semi-spherical shape, and the pressing part was coated with a fluorine resin was used as the stamper. This laminate was mounted in the pressing section of a compression molding machine (Shinto Metal Industries Corporation, model 'S-37.5'), and while maintaining the green sheet at a temperature of 40° C., it was pressurized with a pressing force of 22.5 MPa (230 kgf/cm$^2$) for a pressing time of 2 seconds, and then the stamper was peeled from the green sheet to obtain an alumina/zirconia-based green sheet in which convexes were formed.

Figure 5:
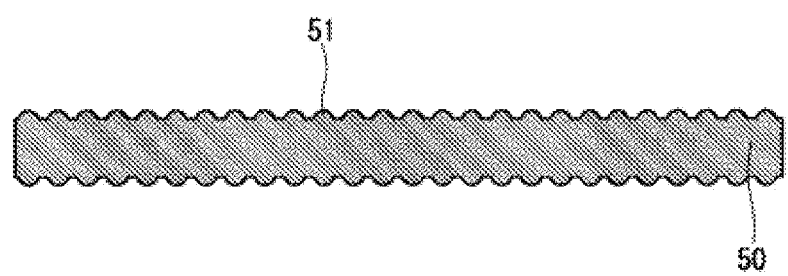
FIG. 5 is a cross-sectional view schematically depicting a convex shaped spacer used in examples of the present invention.
Figure 6:
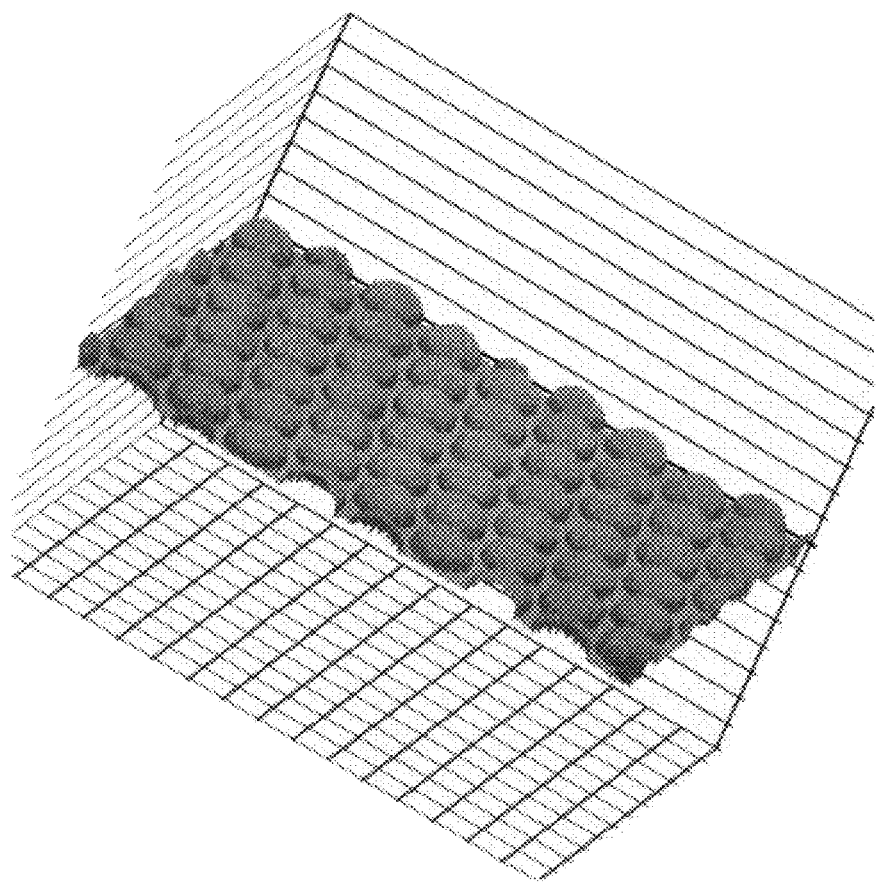
FIG. 6 is a color ultra-deep image showing a 3-dimensional shape of an example of a convex shaped alumina/zirconia-based spacer that can be employed in the present invention.

By firing this green sheet for 3 hours at 1550° C., an alumina/zirconia-based spacer 50 having convexes 51 on surface as shown in FIG. 5 was obtained. The alumina/zirconia-based spacer 50 has a shape shown in the a color ultra-deep image showing a 3-dimensional shape of the alumina/zirconia-based spacer of FIG. 6 in which the 3-dimensional shape of the projections is semi-spherical, and the projections have been formed closely and regularly on the spacer basal plane (flat portion excluding the projections).

Figure 7:
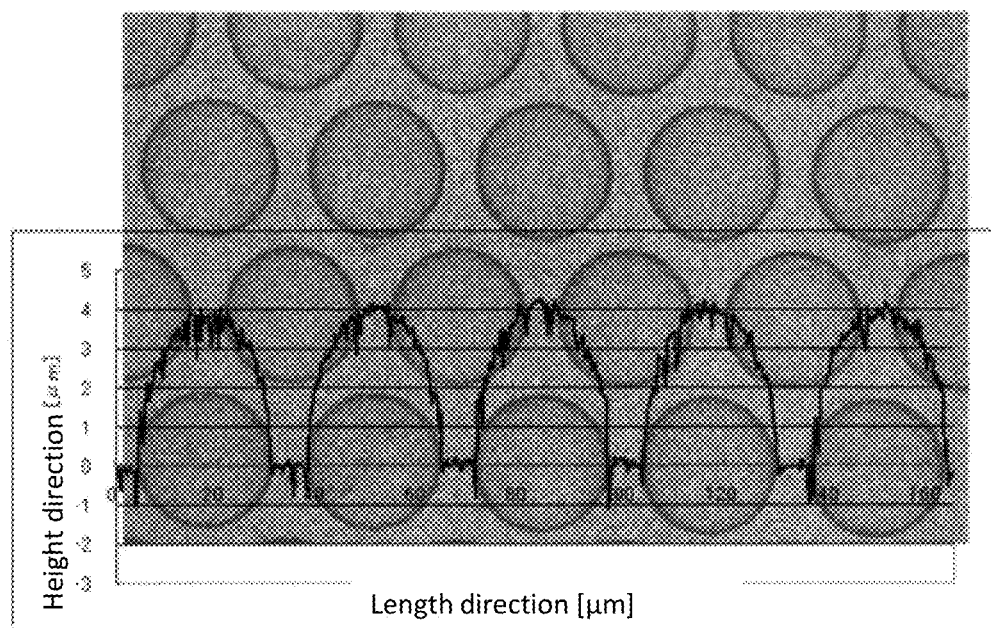
FIG. 7 is a diagram of superimposing a 2-dimensional image and convex shaped profile data of an example of a convex shaped alumina/zirconia-based spacer that can be employed in the present invention.

Also, reading from the diagram as shown in FIG. 7 obtained by superimposing the 2-dimensional shape image of the projection-shaped alumina/zirconia-based spacer and the convex shape profile data, the mean height of the convexes was 4.0 μm, the mean interval between the vertexes of adjacent projections was 34 μm, and the mean circle equivalent diameter of the projections was 24 μm. Further, the mean thickness was 160 μm and it was a 130 mm square.

(2) Convex Shaped Mullite-Based Spacer
(Preparation of Mullite-Based Green Sheet)

A mixture of 17.5 parts by mass of a binder that was used in the preparation of the green sheet for electrolyte sheet, 45 parts by mass of a toluene/isopropyl alcohol mixed solvent (mass ratio: 3/2) as dispersing solvent, 2 parts by mass of a sorbitan fatty acid ester surface active agent as a dispersant, and 3.5 parts by mass of dibutyl phthalate as plasticizer was mixed with respect to 100 parts by mass of a high-purity mullite powder having a specific surface area of 8.5 m$^2$/g and the mean particle size of 0.8 μm (KCM Corporation Co., Ltd., product name 'KM') while grinding them in a ball mill to obtain a slurry.

Moreover, in a manner similar to the preparation of the green sheet for an electrolyte sheet, this slurry was concentrated and degassed such that the viscosity was adjusted to 10 Pa·s. A long green tape was obtained by doctor blade technique. Further, in a manner similar to the manufacturing of the green sheet for an electrolyte sheet, the green tape was cut to obtain a mullite-based green sheet of approximately 160 mm square and approximately 280 μm thickness.

(Preparation of Convex Shaped Mullite-Based Spacer)

By using the above-mentioned mullite green sheet, a stacked body was fabricated in a manner similar to the case of the alumina/zirconia-based green sheet, and this stacked body was mounted on the press part of a compression molding machine (Shinto Metal Industries Corporation, model 'S-37.5') and pressurized under the conditions of a pressing force of 11.8 MPa (120 kgf/cm$^2$) and pressing time of 30 seconds. After pressurizing, it was cooled to 30° C. or below, and the stamper was peeled off the green sheet to obtain a mullite-based green sheet having convexes.

By firing this green sheet at 1500° C. for 3 hours, a mullite-based spacer was obtained. The 3-dimensional shape of the convex was semi-spherical, the mean height of the projections was 9.2 μm, the mean interval between the vertexes of adjacent convexes was 53 μm, and the mean circle equivalent diameter of the convexes was 41 μm. The mean thickness was 221 μm and a square of 130 mm.

(3) Spherical Alumina Particle-Based Spacer 40 parts by mass of a solvent and 2.5 parts by mass of a dispersant the same as the case of manufacturing the aforementioned alumina/zirconia-based green sheet were added to 95 parts by mass of commercial alumina of spherical shape particles with mean particle size of 0.7 μm and specific surface area of 7.5 m$^2$/g and 5 parts by mass of the aforementioned zirconia powder stabilized with 3 mol % of yttrium oxide, and then they were mixed while grinding. 15 parts by mass of a similar binder and 2 parts by mass of a plasticizer were further mixed and made into a slurry. Using this slurry, a long green tape having a thickness of 280 μm was obtained in a manner similar to the case of the alumina/zirconia-based green tape mentioned above. Furthermore, this green tape was cut in a manner similar to the manufacturing of the green sheet for an electrolyte sheet to obtain a spherical-shaped alumina-based green sheet of approximately 160 mm square. This green sheet was fired at 1550° C. for 3 hours to obtain a spherical-shaped alumina particle-based spacer of approximately 130 mm square and 230 μm thickness.

(4) Irregular Shaped Alumina Particle-Based Spacer 40 parts by mass of a solvent and 2.5 parts by mass of a dispersant same as the case of manufacturing the aforementioned alumina/zirconia-based green sheet were added to 100 parts by mass of irregular shaped alumina particles with a mean particle size of 55 μm (Showa Denko K. K., product name: Al-15), and they were mixed while grinding. 15 parts by mass of a binder and 2 parts by mass of a plasticizer were further mixed and made into a slurry. Using this slurry, a long green tape having a thickness of 280 μm was obtained in a manner similar to the case of the alumina/zirconia-based green tape mentioned above. This green tape was cut in a manner similar to the manufacturing of the green sheet for an electrolyte sheet to obtain an irregular alumina-based green sheet of approximately 160 mm square. This green sheet was fired at 1580° C. for 3 hours to obtain a spherical-shaped alumina particle-based spacer of approximately 130 mm square and thickness of 260 μm.

Next, electrolyte sheets of various examples and comparative examples are described.

Example 1

Preparation of 6ScSZ Electrolyte Sheet

Figure 8:
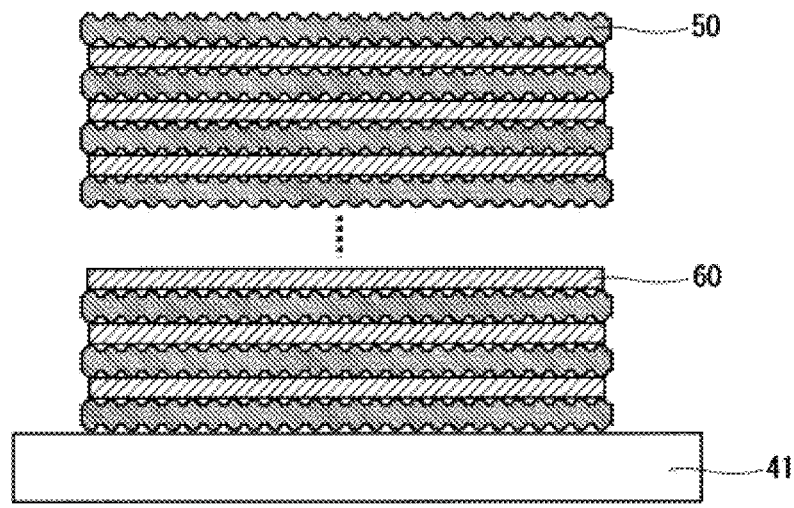
FIG. 8 is a cross-sectional view schematically depicting a stacked body of green sheets and convex shaped spacers in examples of the present invention.

With a combination of the 6ScSZ green sheet and the convex shaped alumina/zirconia spacer obtained as above, 100 sets of stacked bodies including ten 6ScSZ green sheets 60 and eleven spacers 50 as shown in FIG. 8 were prepared. These bodies were mounted on an alumina setter 41 having 10 mm thickness and 280 mm square, and with the setters mutually stacked by the mediation of a strut (not illustrated), they were introduced in a batch type firing furnace, and fired at 1420° C. for 3 hours. With this, 1000 6ScSZ electrolyte sheets of 100 mm square and 180 μm thickness were produced. As for their surface roughness (Ra) as measured according to JIS B0601: 2001 with a stylus type roughness meter (Mitsutoyo Corporation, model 'SJ-201'), the mean Ra of one side was 0.05 µm, and the mean Ra of the other side was 0.12 µm.

Example 2

Preparation of 8YSZ Electrolyte Sheet

With a combination of the 8YSZ green sheet and the convex shaped mullite spacer produced as above, 100 sets of stacked bodies including ten 8YSZ green sheets 60 and eleven spacers 50 as shown in FIG. 8 were prepared. These stacks were mounted on an alumina setter 41 of 10 mm thickness and 280 mm square, and with the setters mutually stacked by the mediation of a strut (not illustrated), they were introduced in a batch type firing furnace and fired at 1450° C. for 3 hours. With this, 1000 8YSZ electrolyte sheets of approximately 100 mm square and 250 µm thickness were produced. As for their surface roughness (Ra) measured by a similar method as the one in example 1, the mean Ra of one side was 0.07 µm, and the mean Ra of the other side was 0.16 µm.

Example 3

Preparation of 6ScSZ Electrolyte Sheet

Using the 6ScSZ green sheet, the projection-shaped alumina/zirconia spacer, and the spherical alumina particles-based spacer obtained as described above, with a combination wherein the projection-shaped alumina/zirconia spacers and the spherical alumina particles-based spacers were alternately disposed between the 6ScSZ green sheets, 100 sets of stacked bodies having ten 6ScSZ green sheets 60, six projection-shaped alumina/zirconia spacers, and five spherical alumina particles-based spacers were prepared. These stacks were mounted on an alumina setter of 10 mm thickness and 280 mm square, and with the setter stacked by the mediation of a strut, they were introduced in a batch type firing furnace and fired at 1420° C. for 3 hours. With this, 1000 6ScSZ electrolyte sheets of 100 mm square and 180 µm thickness were produced. As for their surface roughness (Ra) measured in the similar manner, the mean Ra of one side was 0.07 µm, and the mean Ra of the other side was 0.19 µm.

Comparative Example 1

Except for using a spherical alumina particles-based spacers obtained as described above instead of the convex shaped alumina/zirconia spacer, 1000 6ScSZ electrolyte sheets of approximately 100 mm square and 180 µm thickness were produced in the same manner as example 1.

Comparative Example 2

Except for using an irregular shaped alumina particles-based spacers obtained as described above instead of the convex shaped alumina/zirconia spacer, 1000 6ScSZ electrolyte sheets of approximately 100 mm square and 180 µm thickness were produced in the same manner as example 1.

Examples 4 to 6, and Comparative Examples 3 and 4

In examples 4 to 6, unit cells were prepared using the electrolyte sheets of examples 1 to 3 respectively. In comparative examples 3 and 4, unit cells were prepared using the electrolyte sheets of comparative examples 1 and 2 respectively. The specific method of preparing the unit cell is as follows.

(Preparation of Unit Cell)

From the electrolyte sheets obtained in example 1, 50 sheets were arbitrarily extracted. 50 unit cells for a solid oxide fuel cell were fabricated by forming a fuel electrode on one side and an air electrode on the other side of each electrolyte sheet. More specifically, a fuel electrode paste comprising of 70 parts by mass of nickel oxide powder of a mean particle size 0.9 µm obtained by thermal decomposition of basic nickel carbonate, 30 parts by mass of a powder employed in the production of the above 8 YSZ green sheet, and a solvent, etc. was applied on one side of each electrolyte sheet by screen printing. An intermediate layer paste comprising 20 mol % samarium-doped ceria powder, a solvent, and the like was applied on the other side of each electrolyte sheet by screen printing. This was baked at 1300° C. to form a fuel electrode and an intermediate layer in each of the electrolyte sheets.

Next, an air electrode paste comprising 80 parts by mass of commercial strontium-doped lanthanum iron cobaltate ($La_{0.6}Sr_{0.4}Fe_{0.8}Co_{0.2}O_3$) powder, 20 parts by mass of 20 mol % gadollinia-doped ceria powder, a solvent and the like was applied on the intermediate layer by screen printing. This was baked at 1000° C., and a 4-layer structure unit cell was obtained. Using the electrolyte sheets obtained in examples 2 and 3 as well as comparison examples 1 and 2, a 4-layer structured unit cell was prepared in a similar manner. The unit cell prepared using the electrolyte sheet of example 1 was considered as example 4. The unit cell prepared using the electrolyte sheet of example 2 was considered as example 5, and the unit cell prepared using the electrolyte sheet of example 3 was considered as example 6. The unit cell prepared using the electrolyte sheet of comparative example 1 was considered as comparative example 3. The unit cell prepared using the electrolyte sheet of comparative example 2 was considered as comparative example 4.

(Test 1)

For each of the 100 electrolyte sheets obtained in examples 1 to 3 and comparative examples 1 and 2, the aforementioned fluorescent flaw-detecting penetration test and CCD flaw inspection were carried out on both sides of the electrolyte sheet. Table 1 shows the number of cracks detected by the fluorescent flaw-detecting penetration test and the number of cracks detected by the CCD camera inspection in each section of any one electrolyte sheet selected from the 100 sheets. Moreover, similar tests were carried out for each of the 100 sheets as well, and Table 2 shows the mean value of the number of sections where the detected number of cracks by the fluorescent flaw-detecting penetration test exceeds 30, and the mean value of the number of sections where the detected number of cracks by the CCD camera inspection exceeds 7.

(Test 2)

The bending strength test and the load-tolerance test were carried out for each of 20 electrolyte sheets obtained in examples 1 to 3 and comparative examples 1 and 2, and also for each of 20 unit cells obtained in examples 4 to 6 and comparative examples 3 and 4. The result is shown in Table 2 and Table 3.

TABLE 1

| Sheet side | Section | Example 1 Fluorescent flaw-detecting penetration test | Example 1 CCD inspection | Example 2 Fluorescent flaw-detecting penetration test | Example 2 CCD inspection | Example 3 Fluorescent flaw-detecting penetration test | Example 3 CCD inspection | Comparative Example 1 Fluorescent flaw-detecting penetration test | Comparative Example 1 CCD inspection | Comparative Example 2 Fluorescent flaw-detecting penetration test | Comparative Example 2 CCD inspection |
|---|---|---|---|---|---|---|---|---|---|---|---|
| One side | A a | 7 | 2 | 10 | 5 | 16 | 4 | 9 | 1 | 14 | 2 |
| | A b | 10 | 1 | 17 | 1 | 3 | 2 | 22 | 2 | <u>32</u> | 1 |
| | A c | 9 | 2 | 13 | 5 | 12 | 3 | 27 | 3 | 28 | 6 |
| | A d | 5 | 0 | 8 | 3 | 7 | 1 | 16 | 2 | 17 | 2 |
| | B a | 8 | 1 | 6 | 1 | 19 | 6 | 13 | 1 | 8 | 1 |
| | B b | 18 | 3 | 20 | 4 | 10 | 5 | <u>35</u> | 6 | <u>43</u> | <u>9</u> |
| | B c | 23 | 1 | 21 | 4 | 5 | 1 | <u>34</u> | <u>8</u> | <u>39</u> | 2 |
| | B d | 10 | 3 | 14 | 1 | 7 | 2 | 10 | 2 | 10 | 0 |
| | C a | 6 | 1 | 15 | 1 | 22 | 4 | 19 | 0 | 13 | 0 |
| | C b | 14 | 2 | 26 | 2 | 13 | 1 | <u>38</u> | <u>8</u> | <u>51</u> | <u>9</u> |
| | C c | 19 | 1 | 8 | 1 | 21 | 3 | 24 | 1 | 33 | 3 |
| | C d | 4 | 0 | 9 | 3 | 24 | 4 | 30 | 1 | 20 | 2 |
| | D a | 2 | 0 | 11 | 2 | 16 | 5 | 14 | 2 | 11 | 2 |
| | D b | 8 | 1 | 16 | 3 | 6 | 3 | 28 | 4 | 24 | 1 |
| | D c | 11 | 2 | 22 | 2 | 10 | 4 | 30 | 5 | <u>35</u> | 3 |
| | D d | 3 | 2 | 5 | 1 | 11 | 4 | 15 | 2 | 28 | 2 |
| The other side | A a | 12 | 3 | 16 | 1 | 9 | 3 | 13 | 1 | 12 | 2 |
| | A b | 14 | 1 | 14 | 5 | <u>32</u> | 7 | 8 | 4 | <u>39</u> | 7 |
| | A c | 9 | 2 | 27 | 3 | 23 | 5 | 24 | 4 | 28 | 4 |
| | A d | 10 | 5 | 3 | 0 | 19 | 2 | <u>32</u> | <u>8</u> | 17 | 5 |
| | B a | 3 | 0 | 8 | 1 | 24 | 3 | 6 | 1 | 16 | 3 |
| | B b | 1 | 0 | 6 | 2 | 19 | 5 | 18 | 0 | 13 | 5 |
| | B c | 4 | 1 | 16 | 5 | 8 | 0 | 17 | 5 | <u>44</u> | 6 |
| | B d | 15 | 1 | 10 | 4 | 7 | 2 | 30 | 5 | 29 | 8 |
| | C a | 7 | 3 | 18 | 5 | 21 | 3 | 9 | 3 | 28 | 5 |
| | C b | 10 | 5 | 12 | 2 | 27 | 5 | 27 | 5 | <u>49</u> | <u>8</u> |
| | C c | 9 | 1 | 15 | 0 | 19 | 4 | 21 | 2 | 29 | 1 |
| | C d | 12 | 2 | 3 | 1 | 13 | 2 | <u>33</u> | 6 | 23 | 5 |
| | D a | 16 | 1 | 1 | 0 | 15 | 4 | 6 | 2 | 15 | 5 |
| | D b | 21 | 5 | 4 | 1 | <u>31</u> | <u>8</u> | 15 | 2 | <u>36</u> | 10 |
| | D c | 13 | 1 | 10 | 1 | 22 | 4 | <u>31</u> | <u>8</u> | <u>34</u> | <u>9</u> |
| | D d | 8 | 2 | 9 | 3 | 17 | 1 | 4 | 1 | 13 | 4 |

TABLE 2

| Electrolyte sheet | | Example 1 | Example 2 | Example 3 | Comparative Example 1 | Comparative Example 2 |
|---|---|---|---|---|---|---|
| Average number of sections where the number of cracks detected by the fluorescent flaw-detecting penetration test exceeds 30 | One side | 0 | 0 | 0 | 3.3 | 4.4 |
| | Other side | 0 | 0 | 2.5 | 4.8 | 5.3 |
| Average number of sections where the number of cracks detected by the CCD inspection exceeds 7 | One side | 0 | 0 | 0 | 2.1 | 2.6 |
| | Other side | 0 | 0 | 1.1 | 1.6 | 4.3 |
| Mean bending strength (MPa) | | 560 | 220 | 545 | 530 | 480 |
| Crack incidence rate (%) | | 0 | 0 | 2 | 10 | 30 |

TABLE 3

| Unit cell | Example 4 | Example 5 | Example 6 | Comparative Example 3 | Comparative Example 4 |
|---|---|---|---|---|---|
| Electrolyte sheet used | Example 1 | Example 2 | Example 3 | Comparative Example 1 | Comparative Example 2 |
| Mean bending strength (MPa) | 550 | 215 | 535 | 510 | 435 |
| Crack incidence rate (%) | 0 | 0 | 4 | 15 | 40 |

As shown in Table 1, in any section of a length of 30 mm per side and section of less than 30 mm per side on both sides of the electrolyte sheets of examples 1 and 2, the number of cracks detected by the fluorescent flaw-detecting penetration test was 30 or less, and the number of cracks detected by the CCD flaw inspection was 7 or less.

Further, in the electrolyte sheet of example 3, any section on the side in contact with the convex shaped spacer included 30 or less cracks detected in the fluorescent flaw-detecting penetration test and 7 or less cracks detected in the CCD flaw inspection, but as for the sections of the side in contact with the spherical particle-based spacer, there were two sections wherein the number of cracks detected by the fluorescent flaw-detecting penetration test was more than 30 and one section wherein the number of cracks detected in the CCD flaw inspection was more than 7.

In the electrolyte sheets of comparative examples 1 and 2, there were at least 3 sections on one side wherein the number of cracks detected in the fluorescent flaw-detecting penetration test exceeded 30. There were 2 or more sections wherein the number of cracks detected in the CCD flaw inspection exceeded 7.

Further, as shown in Table 2, the electrolyte sheet of example 1 included no section having the number of cracks detected by the fluorescent flaw-detecting penetration test exceeding 30 or the number of cracks detected by the CCD flaw inspection exceeding 7, and showed a bending strength of 560 MPa and no cracks in the load-tolerance test. In contrast to this, the electrolyte sheet of comparative example 1 including a large number of cracks showed the lower bending strength as compared to example 1, and cracking of the sheet was observed in the load-tolerance test. In case of the electrolyte sheet of comparative example 2 including an even larger number of cracks, the bending strength decreased by 15% compared to example 1, and the incidence rate of cracks in the sheet in the load-tolerance load test was also higher by 30% as compared to example 1.

Further, as for the electrolyte sheet of example 3, one side included no section wherein the number of cracks detected in the fluorescent flaw-detecting penetration test exceeds 30 and no section wherein the number of cracks detected in the CCD flaw inspection exceeds 7, but the other side included a section having more than 30 cracks. The bending strength of this sheet was almost same as example 1, however, slight cracking of the sheet was observed in load-tolerance test.

From this, it is evident that the number of cracks in a section wherein a length of each side of the section is 30 mm or less detected by fluorescent flaw-detecting penetration test affects the strength characteristics of the electrolyte sheet, and the electrolyte sheets complying with the number of cracks specified in the present invention have high quality as they have superior bending strength and efficiency in load-tolerance test.

Furthermore, the unit cell of example 4 using the electrolyte sheet of example 1 showed a bending strength of 550 MPa, which is slightly lower, but no crack of the unit cell was shown in load-tolerance test. On the other hand, the unit cell of comparative example 3 using the electrolyte sheet of comparative example 1 having a large number of cracks showed the bending strength decreased by approximately 10% as compared to the unit cell of example 4, and the incidence rate of cracks in the unit cell was 15%, which was high. In the case of the unit cell of comparative example 4 using the electrolyte sheet of comparative example 2 having an even larger number of cracks, the bending strength had decreased significantly and the incidence rate of cracks in the sheet in load-tolerance test was 40%, which was very high.

In addition, the unit cell of example 5 using the electrolyte sheet of example 2 also had a slightly lower bending strength of 215 MPa, but there were no crack in the unit cell by load-tolerance test.

In the case of the unit cell of example 5 using the electrolyte sheet of example 3 in which one side of the sheet contains a section having more than a prescribed number of cracks, the bending strength decreased by approximately 3% as compared to the unit cell of example 4, and the incidence rate of cracks in the unit cell was 4%.

From the above-mentioned facts, it is clear that the zirconia-based electrolyte sheet of the present invention including the specified number of cracks is of high quality, and a unit cell employing such a sheet has superior strength characteristics, and therefore, the zirconia-based electrolyte sheet of the present invention is an electrolyte sheet suitable for obtaining a unit cell of high reliability.

INDUSTRIAL APPLICABILITY

The present invention is a technology relating to an electrolyte sheet for a solid oxide fuel cell and a cell for a solid oxide fuel cell as well as a solid oxide fuel cell containing the electrolyte sheet, and because an electrolyte sheet having highly reliable strength characteristics can be realized, the present invention can contribute to improvement of reliability of a cell for solid oxide fuel cells and solid oxide fuel cells.

What is claimed is:

1. An electrolyte sheet for a solid oxide fuel cell, wherein both sides of the electrolyte sheet have 30 or less cracks including those with a depth of less than 20 μm and a length of less than 100 μm per 30 mm×30 mm wide section as detected by a fluorescent flaw-detecting penetration test, the each section being obtained by dividing the electrolyte sheet into sections;
wherein each of the 30 or less cracks detected by the fluorescent flaw-detecting penetration test are a fluorescent spot formed by a fluorescent paint that penetrates in the cracks during the test,
the electrolyte sheet includes a zirconia-based oxide,
the zirconia-based oxide is a zirconia stabilized with an oxide of at least one element selected from the group consisting of scandium, yttrium, cerium and ytterbium, and
the electrolyte sheet is formed from a green sheet including a binder whose acid value ratio is 0.01 to 0.1.

2. The electrolyte sheet for a solid oxide fuel cell according to claim 1, wherein the each section has 7 or less cracks as detected based on an image obtained with a CCD camera.

3. The electrolyte sheet for a solid oxide fuel cell according to claim 1, wherein the zirconia-based oxide is a zirconia stabilized with an oxide of scandium.

4. The electrolyte sheet for a solid oxide fuel cell according to claim 1, wherein a thickness of the electrolyte sheet is 50 μm to 400 μm and a plane area thereof is 50 $cm^2$ to 900 $cm^2$.

5. The electrolyte sheet for a solid oxide fuel cell according to claim 4, wherein a thickness of the electrolyte sheet is 80 μm to 300 μm and a plane area thereof is 50 $cm^2$ to 900 $cm^2$.

6. The electrolyte sheet for a solid oxide fuel cell according to claim 1, wherein a surface roughness Ra is 0.02 μm to 1.0 μm.

7. A unit cell for a solid oxide fuel cell comprising:
a fuel electrode;
an air electrode; and
an electrolyte sheet for a solid oxide fuel cell according to claim 1, the electrolyte sheet intervening between the fuel electrode and the air electrode,
wherein each of the 30 or less cracks detected by the fluorescent flaw-detecting penetration test are a fluorescent spot formed by a fluorescent paint that penetrates in the cracks during the test detected by the fluorescent flaw-detecting penetration test conducted by a capillary action of a fluorescent penetrant on the surface of the electrolyte sheet,
the electrolyte sheet includes a zirconia-based oxide,
the zirconia-based oxide is a zirconia stabilized with an oxide of at least one element selected from the group consisting of scandium, yttrium, cerium and ytterbium, and
the electrolyte sheet is formed from a green sheet including a binder whose acid value ratio is 0.01 to 0.1.

8. A solid oxide fuel cell comprising the unit cell for a solid oxide fuel cell according to claim 7.

9. The electrolyte sheet for a solid oxide fuel cell according to claim 1, wherein at least one of the both sides of the electrolyte sheet has a flat-shaped surface.

10. The unit cell for a solid oxide fuel cell according to claim 7, wherein at least one of the both sides of the electrolyte sheet has a flat-shaped surface.

11. The electrolyte sheet for a solid oxide fuel cell according to claim 1, wherein said 30 or less cracks with a depth of less than 20 urn and a length of less than 100 urn per 30 mm×30 mm wide section are linear, chain streak, indentation, punctate, circular holes, or dents.

12. The electrolyte sheet for a solid oxide fuel cell according to claim 1, wherein said 30 or less cracks with a depth of less than 20 µm and a length of less than 100 µm per 30 mm×30 mm wide section are linear.

13. The electrolyte sheet for a solid oxide fuel cell according to claim 1, wherein said 30 or less cracks with a depth of less than 20 µm and a length of less than 100 µm per 30 mm×30 mm wide section are linear streaks and/or linear indentations.

14. The electrolyte sheet for a solid oxide fuel cell according to claim 1, wherein said 30 or less cracks with a depth of less than 20 µm and a length of less than 100 µm per 30 mm×30 mm wide section are chain streaks and/or chain indentations.

15. The electrolyte sheet for a solid oxide fuel cell according to claim 1, wherein at least one side of the electrolyte sheet has 6 or 7 cracks as detected based on an image obtained with a CCD camera.

16. The electrolyte sheet for a solid oxide fuel cell according to claim 1, wherein the electrolyte sheet is manufactured by being fired next to a plurality of convexes of an alumina-based spacer sheet.

17. A method of manufacturing an electrolyte sheet for a solid oxide fuel cell, the method comprising:
preparing an alumina-based spacers each having convex-shaped surfaces;
preparing green sheets for the electrolyte sheet, each of the green sheet including a zirconia-based oxide and a binder;
stacking the alumina-based spacers and the green sheets alternatively; and
firing the green sheets after the stacking,
wherein an acid value ratio of the binder is 0.01 to 0.1.

18. The method according to claim 17, wherein degree of penetration of the green sheets is 0.01 to 0.3 mm/min.

\* \* \* \* \*